United States Patent [19]

Routh

[11] Patent Number: 5,310,201

[45] Date of Patent: May 10, 1994

[54] VEHICULAR FOOT BRUSH

[76] Inventor: Finis A. Routh, 5605 County Rd. 68C, Livermore, Colo. 80536

[21] Appl. No.: 84,917

[22] Filed: Jul. 1, 1993

[51] Int. Cl.$^5$ ............................................... B60R 3/04
[52] U.S. Cl. .................................................. 280/164.2
[58] Field of Search .................. 280/164.1, 164.2, 169; 15/238, 239; 24/297, 324, 662; 296/199, 62

[56] References Cited

U.S. PATENT DOCUMENTS

| 543,999 | 8/1895 | Morton | 280/164.2 X |
|---|---|---|---|
| 665,901 | 1/1901 | Hampton | 24/662 X |
| 899,515 | 9/1908 | De Lapp | 280/164.2 X |
| 1,144,439 | 6/1915 | Stanwood | 280/164.2 |
| 1,463,359 | 7/1923 | Erskine | 280/164.2 |
| 1,693,305 | 11/1928 | MacDonald | 280/164.2 |
| 1,948,301 | 2/1934 | Johnson | 24/324 |
| 3,107,409 | 10/1963 | Arthaud et al. | 24/662 |
| 3,747,150 | 7/1973 | Kozub | 280/164.2 X |
| 4,408,372 | 10/1983 | Kimura et al. | 24/662 |

FOREIGN PATENT DOCUMENTS

| 0171908 | 12/1921 | United Kingdom | 280/164.2 |
|---|---|---|---|
| 0315158 | 7/1929 | United Kingdom | 280/164.2 |

Primary Examiner—Brian L. Johnson
Attorney, Agent, or Firm—Leon Gilden

[57] ABSTRACT

A brush member is arranged for fixed securement to a step plate of a vehicle such as a truck and the like, such that the foot brush includes a bottom wall fixedly secured to the step plate, with a top wall including a bristle brush web matrix projecting from the top wall. A modification of the invention includes a lid arranged for positioning over the brushes to depress the brushes in an enhanced removal of debris therefrom for subsequent cleaning.

1 Claim, 3 Drawing Sheets

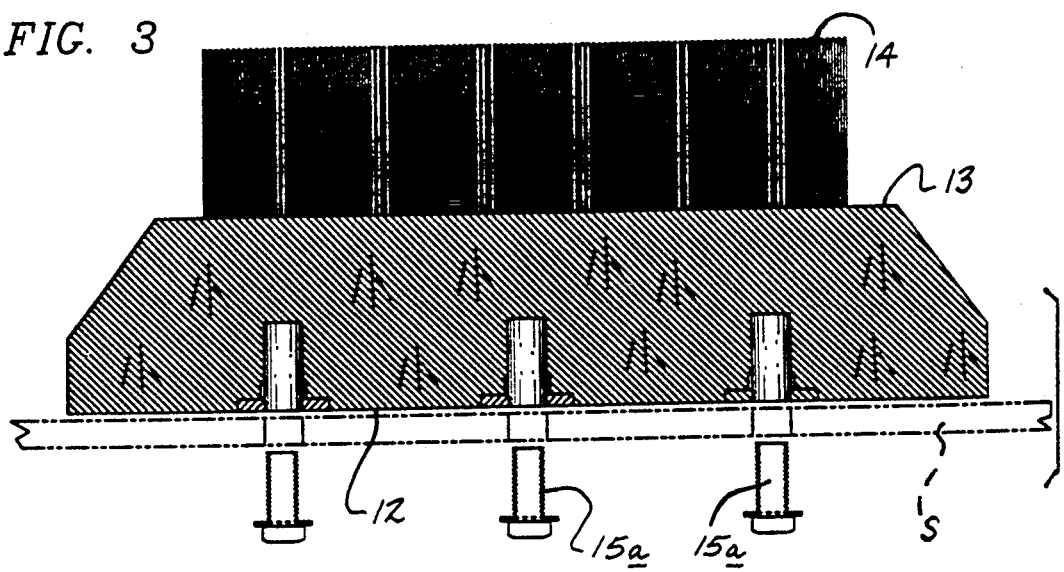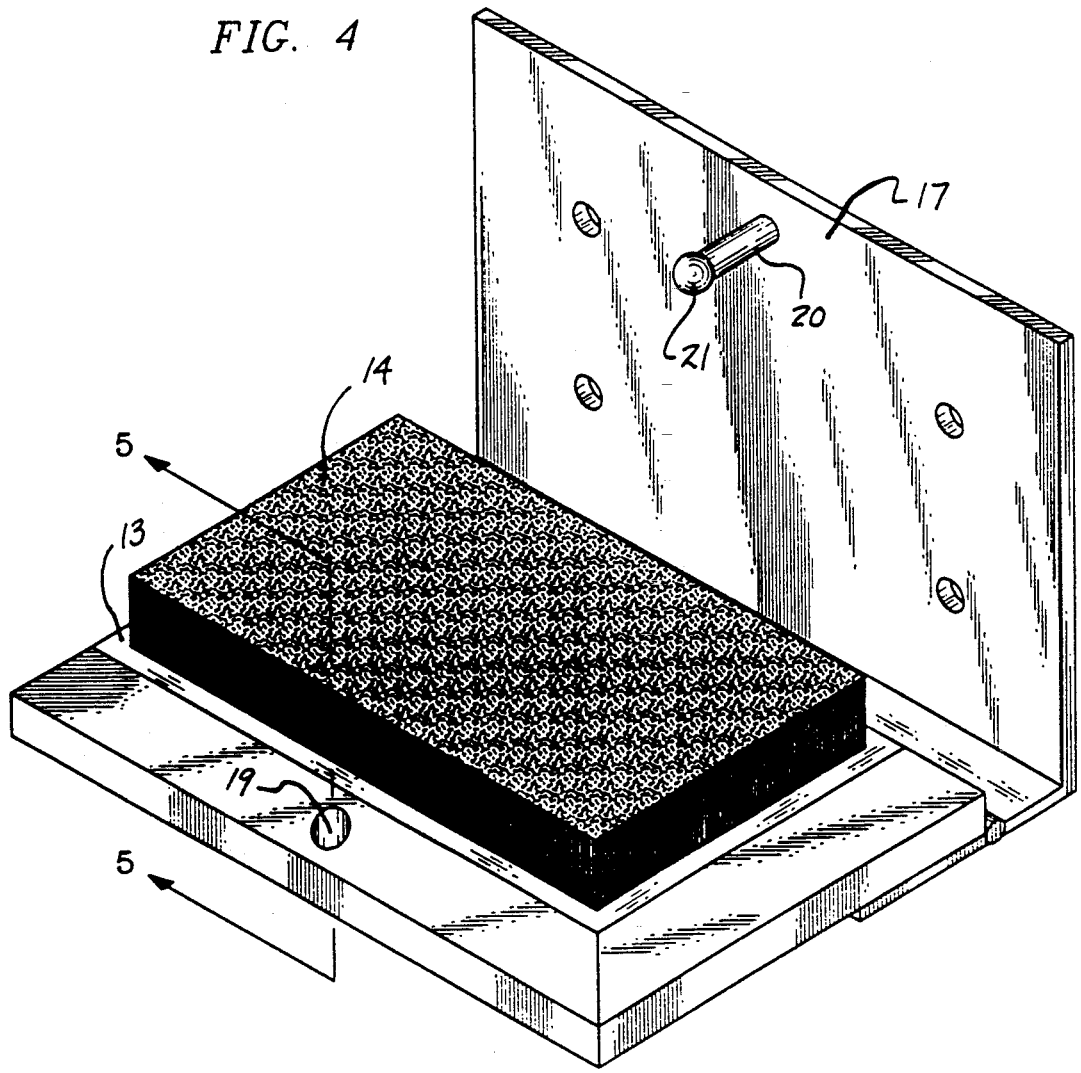

VEHICULAR FOOT BRUSH

BACKGROUND OF THE INVENTION

1. Field of the Invention

The field of invention relates to brush structure, and more particularly pertains to a new and improved vehicular foot brush arranged for mounting to a step plate of an associated self-propelled vehicle.

2. Description of the Prior Art

Brushes of various types are utilized throughout the prior art for the cleaning of shoes and the like, such as indicated in U.S. Pat. No. 3,747,150.

The instant invention attempts to overcome deficiencies of the prior art by employing a foot brush structure mounted to a platform of an associated vehicle effecting cleaning of a shoe sole upon an individual entering the vehicle and in this respect, the present invention substantially fulfills this need.

SUMMARY OF THE INVENTION

In view of the foregoing disadvantages inherent in the known types of brush apparatus now present in the prior art, the present invention provides a vehicular foot brush including a base plate mounting a bristle brush web thereon. As such, the general purpose of the present invention, which will be described subsequently in greater detail, is to provide a new and improved vehicular foot brush which has all the advantages of the prior art brush apparatus and none of the disadvantages.

To attain this, the present invention provides a brush member arranged for fixed securement to a step plate of a vehicle such as a truck and the like, such that the foot brush includes a bottom wall fixedly secured to the step plate, with a top wall including a bristle brush web matrix projecting from the top wall. A modification of the invention includes a lid arranged for positioning over the brushes to depress the brushes in an enhanced removal of debris therefrom for subsequent cleaning.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular foot brush which has all the advantages of the prior art brush apparatus and none of the disadvantages.

It is another object of the present invention to provide a new and improved vehicular foot brush which may be easily and efficiently manufactured and marketed.

It is a further object of the present invention to provide a new and improved vehicular foot brush which is of a durable and reliable construction.

An even further object of the present invention is to provide a new and improved vehicular foot brush which is susceptible of a low cost of manufacture with regard to both materials and labor, and which accordingly is then susceptible of low prices of sale to the consuming public, thereby making such vehicular foot brushes economically available to the buying public.

Still yet another object of the present invention is to provide a new and improved vehicular foot brush which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 1 in the direction indicated by the arrows.

FIG. 4 is an isometric illustration of the invention employing a lid structure.

DESCRIPTION OF THE PREFERRED EMBODIMENT

Figure 1:
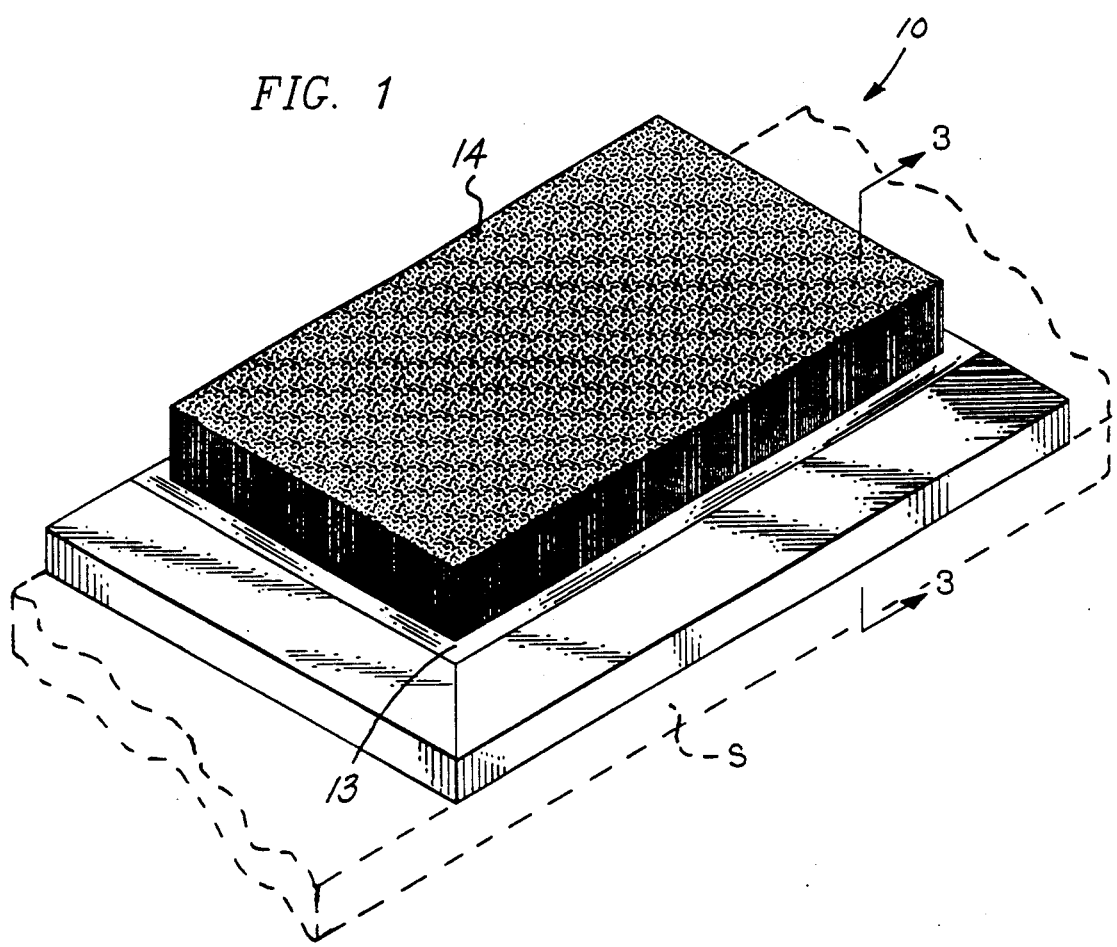
FIG. 1 is an isometric illustration of the invention.
Figure 2:
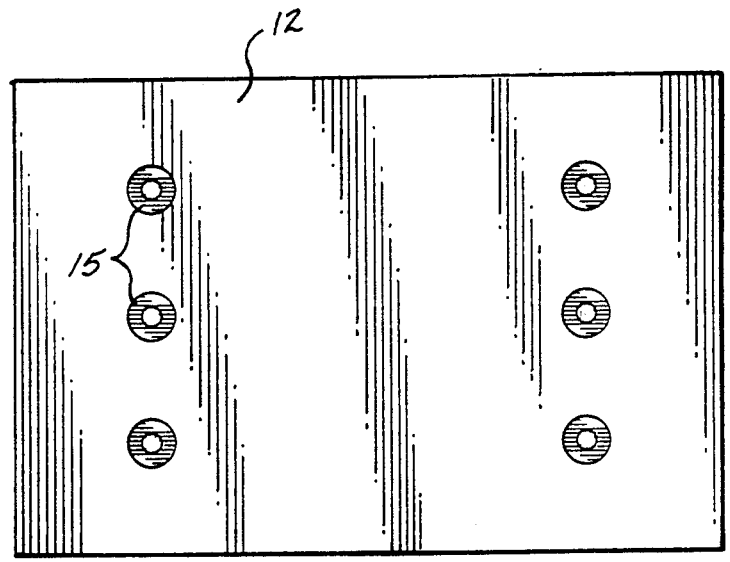
FIG. 2 is an orthographic bottom view of the invention.
Figure 5:
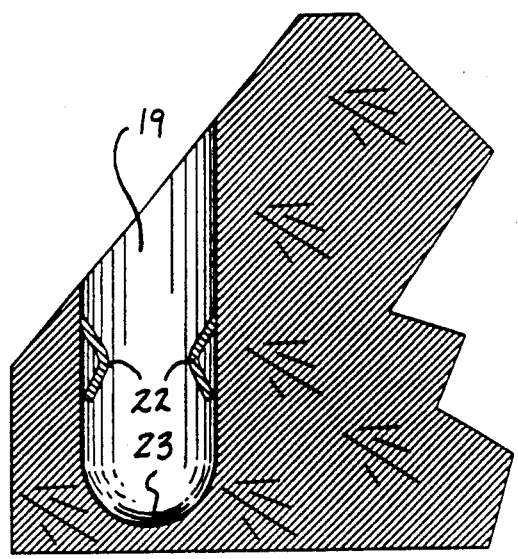
FIG. 5 is an enlarged orthographic view, taken along the lines 5—5 of FIG. 4 in the direction indicated by the arrows.

With reference now to the drawings, and in particular to FIGS. 1 to 6 thereof, a new and improved vehicular foot brush embodying the principles and concepts of the present invention and generally designated by the reference numeral 10 will be described.

More specifically, the vehicular foot brush 10 of the instant invention essentially comprises a base plate 11 having a bottom wall 12 spaced from a top wall 13, with a bristle brush web matrix 14 mounted to the top wall 13 extending orthogonally thereto in a projecting relationship. A plurality of threaded bores 15 are directed to the base plate to the bottom wall 12, wherein the threaded bores are each arranged to receive a fastener 15a (see FIG. 3) as the fastener is directed through the vehicular step plates into a respective bore 15 to fixedly mount the base plate to the step plate, as illustrated in FIG. 3 for example.

The FIG. 4 indicates a hinge 16 mounting a lid 17, wherein the hinge is positioned in adjacency relative to the bottom wall to cant the lid as it is directed over the brushes of the bristle brush web matrix 14 to thereby cant the brushes and enhance dislodging of debris therefrom to assist ease in vacuuming of debris. A top wall latch socket 19 is directed into the top wall of the base plate in adjacency to the brush matrix, such that the latch rod includes a resilient head 21. The top wall latch socket 19 (see FIG. 5) includes a plurality of spring plates 22 positioned in adjacency to the socket floor 23 to secure and receive a resilient head 21 beyond the spring plates 22. A resilient head cushion is directed to the socket floor 23 as well as permitting ease of securement of the resilient head past the spring plates 22.

Figure 6:
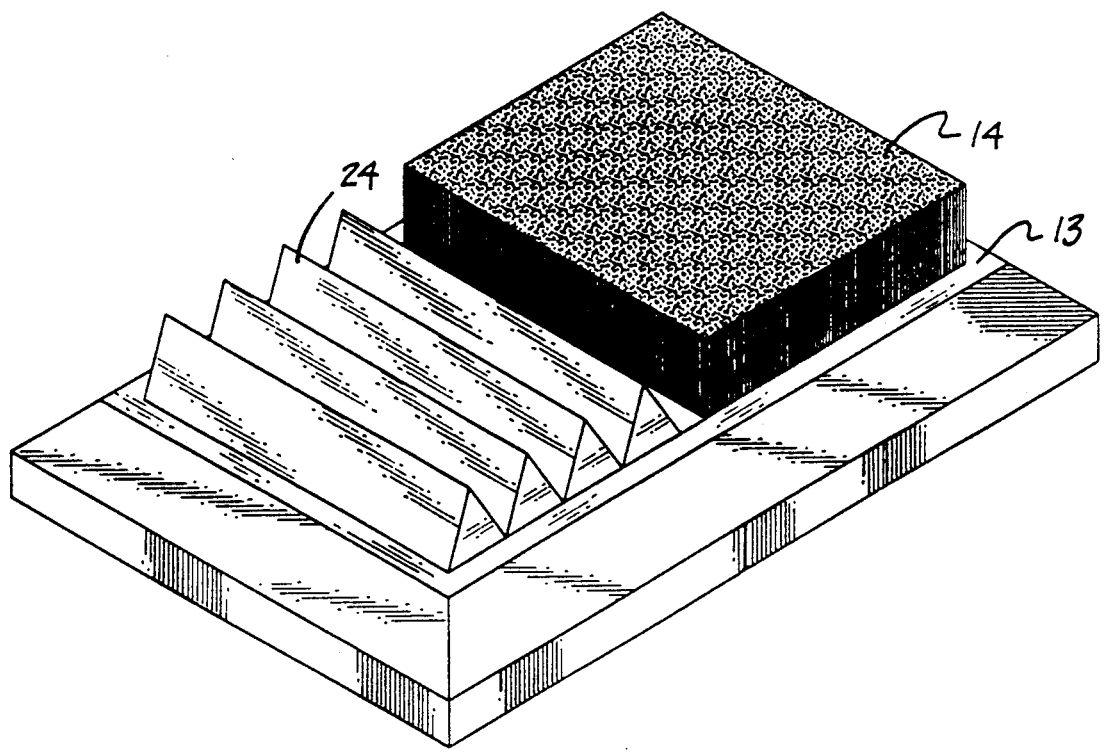
FIG. 6 is an orthographic view of a modified top wall of the base plate to further employ scraping ribs positioned in adjacency to the bristle brush matrix.

The FIG. 6 arranges the additional use of parallel scraping ribs 24 mounted to the top wall 13 extending to the web matrix 14 to provide for additional ease of scraping debris from an individual's shoe sole in addition to the cleaning thereof by the brush matrix.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular foot brush arranged in combination with a vehicular step plate, a base plate mounted to the step plate, the base plate including a top wall spaced from a bottom wall, with the top wall including a bristle brush web matrix extending orthogonally relative to the top wall, and a plurality of threaded bores directed into the bottom wall, and a plurality of fasteners directed through the vehicular step plate and received within the threaded bores to affix the base plate to the step plate, and a hinge mounted to the base plate, the hinge having a lid mounted to the hinge, the lid having a latch rod, with the latch rod including a resilient head mounted to the latch rod, the latch rod orthogonally and fixedly mounted to the lid spaced from the hinge, and the top wall including a top wall socket, the socket having a socket floor, with a plurality of spring plates mounted within the socket in spaced adjacency to the floor to effect ease of projection of the resilient head beyond the spring plates and in communication with the socket floor, and the top wall further includes a plurality of parallel scraping ribs of rigid construction, fixedly mounted to the top wall and the scraping ribs extending along the top wall from the bristle brush web matrix.

* * * * *